US008120796B2

(12) United States Patent  (10) Patent No.: US 8,120,796 B2
Matsunoshita  (45) Date of Patent: Feb. 21, 2012

(54) IMAGE PROCESSING APPARATUS, IMAGE PROCESSING SYSTEM, IMAGE PROCESSING METHOD, COMPUTER-READABLE MEDIUM AND COMPUTER DATA SIGNAL

(75) Inventor: Junichi Matsunoshita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 903 days.

(21) Appl. No.: 12/143,367

(22) Filed: Jun. 20, 2008

(65) Prior Publication Data

US 2009/0161993 A1 Jun. 25, 2009

(30) Foreign Application Priority Data

Dec. 20, 2007 (JP) .................................. 2007-328756

(51) Int. Cl.
    *G06F 15/00* (2006.01)
    *G06K 9/60* (2006.01)
(52) U.S. Cl. ........................................ 358/1.14; 382/305
(58) Field of Classification Search .................. 358/1.14, 358/1.15, 476, 412, 302, 435; 382/305, 284; 356/612, 394, 244
    See application file for complete search history.

(56) References Cited

U.S. PATENT DOCUMENTS

| 2004/0128555 A1* | 7/2004 | Saitoh et al. ................... 713/201 |
| 2006/0259983 A1 | 11/2006 | Sperry |
| 2007/0043864 A1 | 2/2007 | Nemoto |
| 2007/0058994 A1 | 3/2007 | Yaguchi |
| 2007/0133035 A1 | 6/2007 | Kondo et al. |

FOREIGN PATENT DOCUMENTS

| CN | 1863268 A | 11/2006 |
| CN | 1921537 A | 2/2007 |
| JP | A-5-63867 | 3/1993 |
| JP | A-2004-152260 | 5/2004 |
| JP | A-2004-192610 | 7/2004 |
| JP | A-2005-151149 | 6/2005 |
| JP | A-2007-76828 | 3/2007 |

OTHER PUBLICATIONS

Chinese Office Action issued May 27, 2010 in Chinese Patent Application No. 200810134706.1 (with translation).
Jan. 5, 2010 Office Action issued in Japanese Patent Application No. 2007-328756 (with translation).
Mar. 16, 2010 Office Action issued in Australian Patent Application No. 2008203123.

* cited by examiner

*Primary Examiner* — Saeid Ebrahimi Dehkordy
(74) *Attorney, Agent, or Firm* — Oliff & Berridge, PLC

(57) ABSTRACT

An image processing apparatus includes a storage unit, an image receiving unit, a detection unit and a control unit. The storage unit stores number of a plurality of information images included in a reference image. The information images represent data. The image receiving unit receives an image including one or more the information images. The detection unit detects the one or more information images from the image received by the image receiving unit. The control unit performs control relating to a copying operation of the image, based on number of the one or more information images detected by the detection unit and the number of the information images stored in the storage unit.

8 Claims, 16 Drawing Sheets

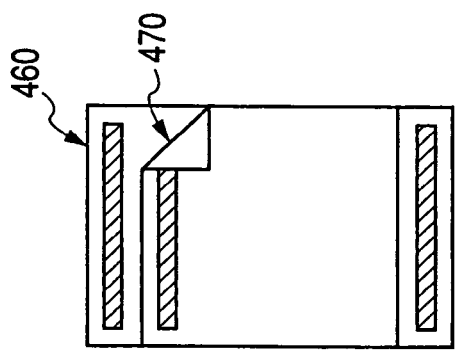
FIG. 4A
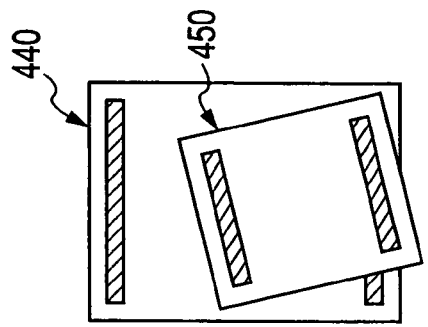
FIG. 4B
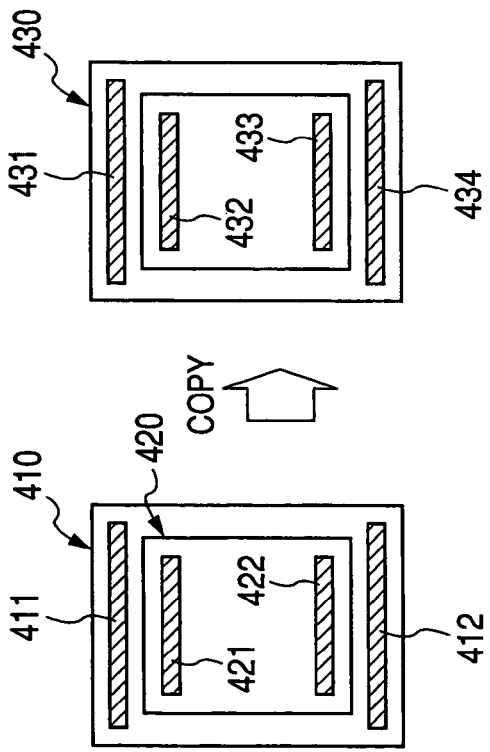
FIG. 4C
FIG. 4D

PATTERN NUMBER 3

PATTERN NUMBER 2

PATTERN NUMBER 1

PATTERN NUMBER 0

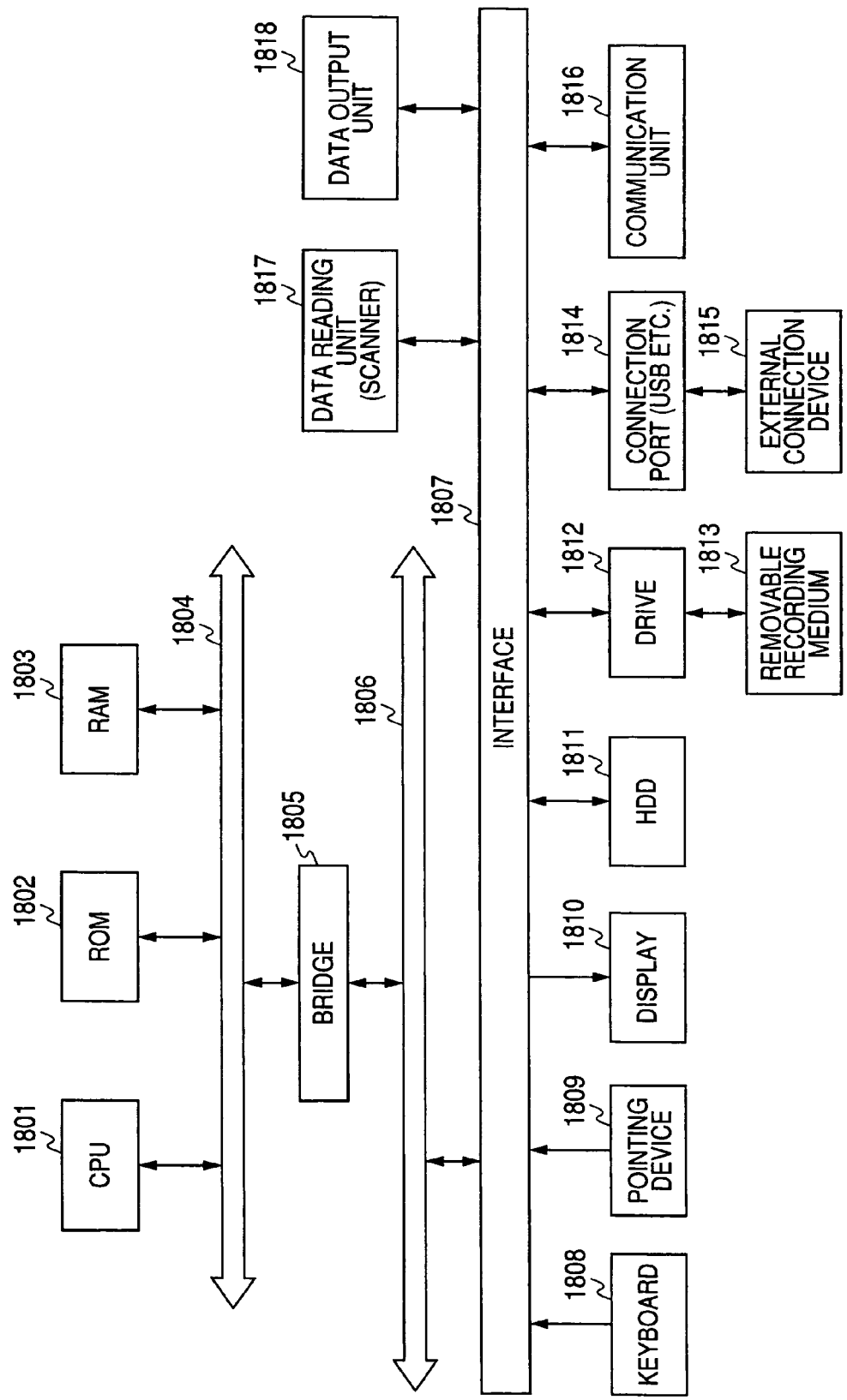

US 8,120,796 B2

IMAGE PROCESSING APPARATUS, IMAGE PROCESSING SYSTEM, IMAGE PROCESSING METHOD, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2007-328756 filed Dec. 20, 2007.

BACKGROUND

1. Technical Field

The invention relates to an image processing apparatus, an image processing system, an image processing method, an image processing program, a computer-readable medium and a computer data signal.

2. Related Art

A multi-functional device which performs operation control in accordance with security information (hereinafter, may be referred to as "security policy") being set for each document is being studied. The multi-functional device is one type of an image processing apparatus having two or more functions such as a scanner, a printer, a copier and a fax machine Here, the term "security" as used herein refers to management necessary for ensuring the safety of a document, and more particularly, refers to settings regarding permission/no-permission of copying.

When operations are performed in accordance with a security policy, the multi-functional device detects a code from image data that are read, decodes the detected code and detects a document ID embedded therein. Then, the multi-functional device makes inquiries concerning the security policy corresponding to the document ID to a server. If a response from the server indicates that copying is permitted, the multi-functional device performs the copying operation (including the scan operation). On the other hand, if the response indicates that copying is not permitted, the multi-functional device interrupts the copying operation.

SUMMARY

According to an aspect of the invention, an image processing apparatus includes a storage unit, an image receiving unit, a detection unit and a control unit. The storage unit stores number of a plurality of information images included in a reference image. The information images represent data. The image receiving unit receives an image including one or more the information images. The detection unit detects the one or more information images from the image received by the image receiving unit. The control unit performs control relating to a copying operation of the image, based on number of the one or more information images detected by the detection unit and the number of the information images stored in the storage unit.

BRIEF DESCRIPTION OF THE DRAWINGS

Exemplary embodiments of the invention will be described in detail based on the following figures, wherein:

FIGS. 4A to 4D are explanatory diagrams showing the cases where two sheets of document media are read in an overlapping state;

FIG. 18 is a block diagram showing the exemplary hardware configuration of a computer that implements the exemplary embodiments of the invention.

DETAILED DESCRIPTION

Hereinafter, exemplary embodiments of the invention will be described with reference to accompanying drawings.

Figure 1:
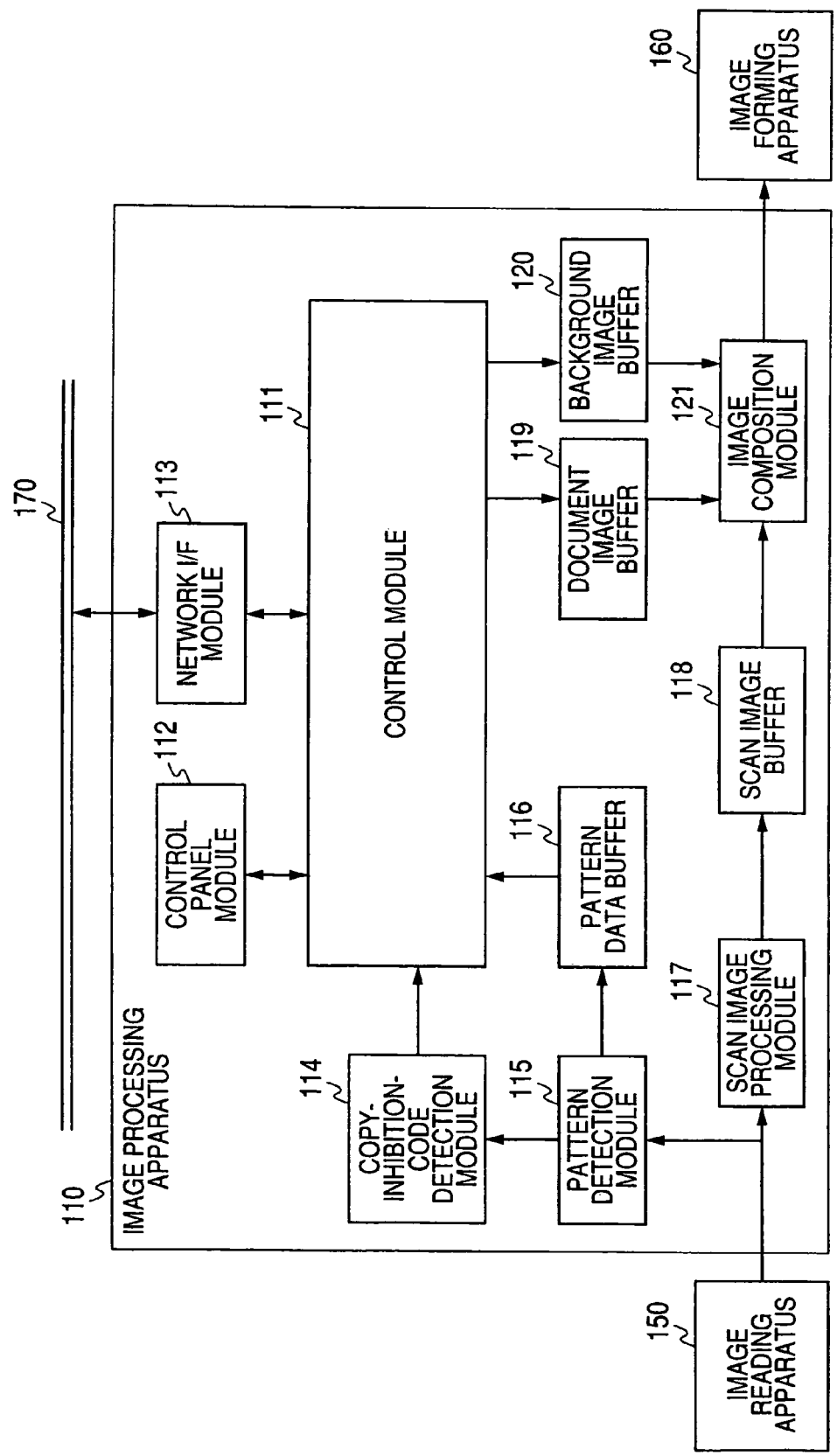
FIG. 1 is a conceptual diagram showing the module configuration according to an exemplary embodiment.

FIG. 1 is a conceptual diagram showing the module configuration according to an exemplary embodiment.

The term "module" as used herein generally represents a component such as software (computer program) or hardware that can be logically separated. Therefore, the module used in the exemplary embodiments of the invention refers to a module having a hardware configuration as well as a module in a computer program. For this reason, this exemplary embodiment provides description of a computer program, a system, and a method. Although "store," "cause to store," or other equivalent terminologies are used for the sake of explanation, when this exemplary embodiment is implemented by a computer program, these terminologies refer to controlling a storage device to store the computer program. The module generally corresponds to a function in a one-to-one basis. In implementation, one module may be configured by one program, or plural modules may be configured by one program. Conversely, one module may be configured by plural programs. Moreover, plural modules may be executed by one computer, or one module may be executed by plural computers in a distributed or parallel computing environment. One module may include another module. In the following descriptions, the term "connection" is used to include not only physical connection but also logical connection (such as transmission/reception of data, instruction, a referencing relationship between data).

The term "system" or "device" as used herein refer to one in which plural computers, hardware, devices or the like are connected to each other via a communication device such as a network (including communication connection in a one-to-one correspondence), and one in which the system or device is realized by one unit of a computer, hardware, an device, and the like. The terms "device" and "system" are used as a synonymous term.

The term "information image" as used herein refers to an image that represents data. By optically reading the "information image", the data can be read. In this exemplary embodiment, the information image is referred to as a code, which will be described with reference to FIGS. 3 to 5. The code represents document identification information (document ID=identification number) or the like.

The term "manage" as used herein means, depending on the context, controlling, managing, or storing data for control or management and represents its role or its operation.

The term "predetermined" as used herein be means "being determined in advance" or "being determined in accordance with a previous state".

This exemplary embodiment includes an image processing apparatus 110, an image reading apparatus 150, and an image forming apparatus 160. The image processing apparatus 110 is connected to another apparatus via a network 170.

The image reading apparatus 150 is connected to a pattern detection module 115 and a scan image processing module 117, which are in the image processing apparatus 110. The image reading apparatus 150 is operable to optically read a document medium to thereby acquire image data (for example, data in which each pixel is represented by R (Red), G (Green), and B (Blue) color components) and passes the acquired image data to the pattern detection module 115 and the scan image processing module 117. For example, the image reading apparatus 150 may read the document image by receiving an image through a scanner or by receiving an image from an external device via a communication line by a fax machine. The document medium includes one in or on which a code representing a document ID is printed. It is needless to say that an image of the code is included in the image data. One image includes plural codes, and codes may be arranged to be distant form each other by a predetermined distance.

The image processing apparatus 110 includes a control module 111, a control panel module 112, a network I/F module 113, a copy-inhibition-code detection module 114, the pattern detection module 115, a pattern data buffer 116, the scan image processing module 117, a scan image buffer 118, a document image buffer 119, a background image buffer 120, and an image composition module 121. The image processing apparatus 110 may receive an image from the image reading apparatus 150. Alternatively, the image processing apparatus 110 may receive a print command from another device via the network 170 to generate an image and perform a process regarding security policy or the like to determine as to whether or not the image is passed to the image forming apparatus 160. When performing the process regarding the security policy, the image processing apparatus 110 may perform the process in cooperation with another device connected thereto via the network 170.

The image reading apparatus 150, the scan image processing module 117, the scan image buffer 218, the image composition module 121, and the image forming apparatus 160 are used for a normal copying process.

The scan image processing module 117 is connected to the image reading apparatus 150 and the scan image buffer 118. The scan image processing module 117 receives the image read by the image reading apparatus 150 and performs image processing for the image so that the processed image is suitable for an image forming process that is performed by the image forming apparatus 160. For example, the image processing includes a color space conversion (from RGB to CMYK), a noise reduction, an image expansion/reduction process, and the like. The processed image is stored in the scan image buffer 118.

The scan image buffer 118 is connected to the scan image processing module 117 and the image composition module 121. The scan image buffer 118 temporarily stores the image processed by the scan image processing module 117, and passes the stored image to the image composition module 121 when being accessed from the image composition module 121.

The control panel module 112 is connected to the control module 111. The control panel module 112 receives an operation command from a user of the image processing apparatus 110 and passes the operation command to the control module 111. Alternatively, the control panel module 112 causes a display device of the image processing apparatus 110 to display, in accordance with a display command from the control module 111.

The network I/F module 113 is connected to the control module 111 and the network 170. The network I/F module 113 receives a reception/transmission command from the control module 111 and transmits the command to another device via the network 170. Alternatively, the network I/F module 113 receives data which is transmitted via the network 170 and passes the data to the control module 111.

The pattern detection module 115 is connected to the image reading apparatus 150, the copy-inhibition-code detection module 114, and the pattern data buffer 116. The pattern detection module 115 receives the image from the image reading apparatus 150, detects a pattern from the image and passes the detected pattern data to the copy-inhibition-code detection module 114 and the pattern data buffer 116. The pattern detection module 115 will be described in detail with reference to FIG. 6.

The copy-inhibition-code detection module 114 is connected to the pattern detection module 115 and the control module 111. The copy-inhibition-code detection module 114 receives the pattern data detected by the pattern detection module 115 and detect a copy inhibition code from the pattern data. The copy-inhibition-code detection module 114 will be described in detail with reference to FIG. 7.

The pattern data buffer 116 is connected to the pattern detection module 115 and the control module 111. The pattern data buffer 116 temporarily stores the pattern data detected by the pattern detection module 115 and passes the stored pattern data when being accessed from the control module 111.

The document image buffer 119 is connected to the control module 111 and the image composition module 121. The document image buffer 119 temporarily stores the document image generated by the control module 111 and passes the stored document image when being accessed from the image composition module 121.

The background image buffer 120 is connected to the control module 111 and the image composition module 121. The background image buffer 120 temporarily stores the background image generated by the control module 111 and passes the stored background image when being accessed from the image composition module 121.

The "buffer" may be a memory or a hard disk.

The image composition module 121 is connected to the scan image buffer 118, the document image buffer 119, the background image buffer 120, and the image forming apparatus 160. The image composition module 121 accesses the scan image buffer 118, the document image buffer 119, and/or the background image buffer 120 to receive images being stored in the accessed image buffer, combines these images and passes the combined image to the image forming apparatus 160. For example, the image composition module 121 combines images which are stored in the document image buffer 119 and the background image buffer 120, to generate a print image containing an information image regarding security policy. Alternatively, the image composition module 121 combines images which are stored in the scan image buffer 118 and the background image buffer 120, to generate a copy image containing an information image regarding security policy. Then, the combined image is passes to the image forming apparatus 160.

The control module 111 is connected to the control panel module 112, the network I/F module 113, the copy-inhibition-code detection module 114, the pattern data buffer 116, the document image buffer 119, and the background image buffer 120. The control module 111 controls the inside of the image processing apparatus 110 while controlling the image reading apparatus 150 and the image forming apparatus 160. For example, the control module 111 generates a document image based on a print command from another device, stores the document image in the document image buffer 119 and converts copy inhibition information, a document ID, and the like into codes to store the codes in the background image buffer 120.

Also, the control module 111 has a storage module for storing the number of plural codes which represent data and which are included in a reference image (an image for which a copying operation is to be permitted). The control module 111 detects a code from the image received by the image reading apparatus 150 using the pattern data stored in the pattern data buffer 116 and performs control relating to the copying operation of the image based on the number of detected codes and the number of codes stored in the storage module.

Also, if the number of codes detected is larger than the number of codes stored in the storage module, the control module 111 may performs the control so that the copying operation of the image is inhibited.

Also, the storage module may further store a distance between the plural codes included in the reference image. In this case, if the number of codes detected is equal to the number of codes stored in the storage module and if the distance between the detected codes is smaller than the distance stored in the storage module, the control module 111 may perform the control so that the copying operation of the image is inhibited.

Also, the data represented by the codes may include document IDs, and the storage module may further store the number of document IDs. The document IDs may be obtained by decoding the detected codes. In this case, if the number of decoded document IDs is larger than the number of document IDs stored in the storage module, the control module 111 may perform the control so that the copying operation of the image is inhibited.

Also, the data represented by the codes may include document IDs, and the document IDs may be obtained by decoding the detected codes. In this case, if the decoded document IDs are different from each other, the control module 111 may perform the control so that the copying operation of the image is inhibited.

Also, the control module 111 may extract document IDs by decoding the plural codes in the image received by the image reading apparatus 150, transmit the decoded document IDs to a security policy server 210, and receive security information (permission or inhibition of copying of the document in accordance with a user) corresponding to the document IDs from the security policy server 210. If at least one of the received security information indicates that copying is not permitted, the control module 111 may perform the control so that the copying operation of the image is inhibited.

Also, upon detection of plural codes from the image received by the image reading apparatus 150, the control module 111 performs control relating to security of the image. More specifically, if codes more than predetermined number are detected, the control module 111 may perform the control so that the copying operation of the image is inhibited. Also, if plural codes are detected and if the codes are distant from each other by more than a predetermined distance, the control module 11 may perform the control so that the copying operation of the image is inhibited. Furthermore, the control module 111 may decode the codes in the image received by the image reading apparatus 150, and if the number of the decoded document IDs is larger than the number of document IDs to be assigned to one image perform, the control module 111 may perform the control so that the copying operation of the image is inhibited. Also, the control module 111 may extract security information corresponding to the document ID, which is obtained by decoding plural codes in the image received by the image reading apparatus 150, and if at least one of the extracted security information indicates that copying is not permitted, the control module 111 may perform the control so that the copying operation of the image is inhibited.

The image forming apparatus 160 is connected to the image composition module 121 of the image processing apparatus 110. The image forming apparatus 160 receives the image combined by the image composition module 121 and performs the image forming operation for the combined image for visualization. For example, the image forming operation may include printing the image on a medium such as a sheet of paper by a printer, displaying the image on a display device, and transmitting the image via a fax machine.

Figure 2:
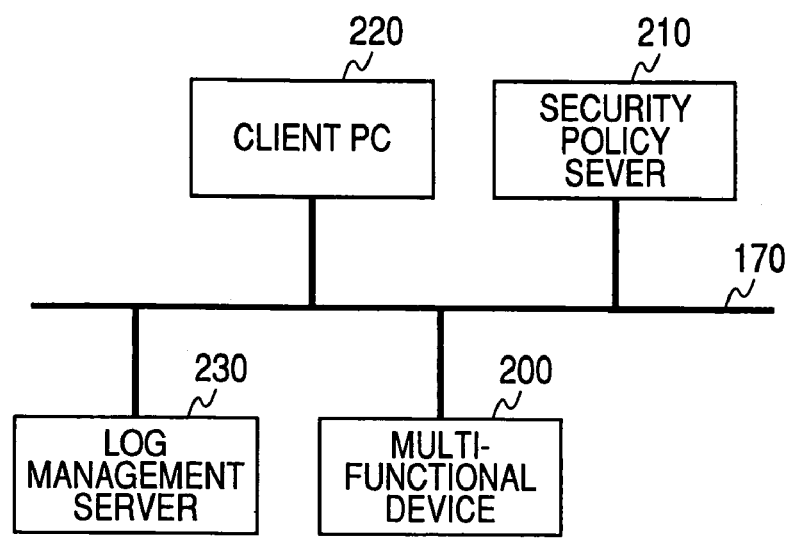
FIG. 2 is an explanatory diagram showing the exemplary system configuration for implementing the exemplary embodiment.

FIG. 2 is an explanatory diagram showing the exemplary system configuration for implementing the exemplary embodiment.

A multi-functional device 200, a security policy server 210, a client PC 220, and a log management server 230 are connected to each other via the network 170.

The multi-functional device 200 includes the image reading apparatus 150, the image processing apparatus 110, and the image forming apparatus 160, which are shown in FIG. 1.

The security policy server 210 manages the security policy which is set for each document. The "security policy", for example, refers to information that associates a combination of a document ID for identifying each document and a user or a group, with an operation authority for each document. Here, the "group" includes at least one user. In the security policy, the users and the groups are treated equally. Also, the security policy server may manage each document ID and a paper size of the corresponding document in association with each other as well as manage the security policy.

The client PC 220 is operated by a user and transmits a print request for printing of files or image data, which is created by a document creating application, to the multi-functional device 200 by using a printer driver installed in the client PC 220.

The log management server 230 manages an operation log or the like of printing in association with a document.

Next, the case where a print operation (protected paper document creation) is performed with the system configuration shown in FIG. 2 will be described. More detailed description thereof will be provided later with reference to the flow charts shown in FIGS. 10 and 11.

(1) A user opens a document using the client PC 220, selects a printer (the multi-functional device 200) and issues a print command. At this time, the security policy (which user or group is permitted to perform a copying operation) is set via a driver screen or the like.

(2) The driver registers the designated policy and a user ID in the security policy server 210 and acquires a document ID issued by the security policy server 210. The security policy server 210 stores the policy settings (security policy) in association with the document ID.

(3) The driver adds a code addition command including the document ID to print data (PDL: page description language) and transmits the print data to the client PC 220.

(4) The client PC 220 generates an image of a code based on the received print data, adds the image of the code to a document image and prints out the document image.

Next, the case where a copying operation is performed with the system configuration shown in FIG. 2 will be described. More detailed description thereof will be provided later with reference to the flow chart shown in FIG. 12.

(1) The multi-functional device 200 performs user authentication for a user. For example, authentication is performed by receiving and certifying a user ID and a password or by using an IC card or the like.

(2) The user places a document medium on the multi-functional device 200 and presses a copy button.

(3) The multi-functional device 200 reads the document medium, detects a code from the read image, decodes the code, and extracts a document ID from the decoded data.

(4) The multi-functional device 200 performs a process relating to the security policy in cooperation with the security policy server 210. That is, the multi-functional device 200 transmits the user ID and the document ID to the security policy server 210 and makes inquiries as to whether or not the copying operation is permitted. If the copying operation is permitted, the read image is output. If the copying operation is not permitted, the copying operation is interrupted.

Also, the system may be configured so that a history of the print operation or the copying operation is stored in the log management server 230.

Also, the multi-functional device 200 may be configured to have the function of the security policy server 210 or the log management server 230. That is, the multi-functional device 200 may be configured to store the number of codes included in the reference image, a distance between the codes, the document ID for which the copying operation is permitted, or the like, and the copying operation of the image may be controlled solely by the multi-functional device 200.

Figure 3:
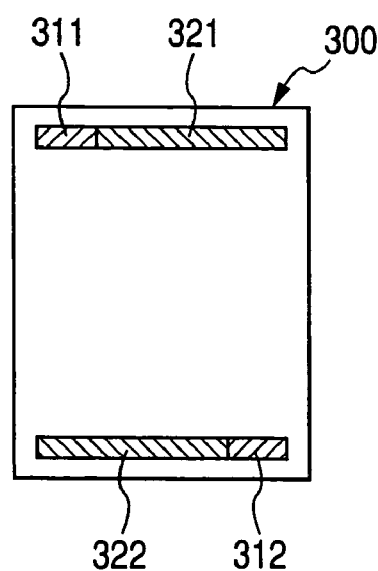
FIG. 3 is an explanatory diagram showing an example of a document image having codes attached thereto.

FIG. 3 is an explanatory diagram showing an example of a document image having codes attached thereto. An image 300 is printed by the system configuration shown in FIG. 2.

The image 300 has a digital code 311, a digital code 312, a copy inhibition code 321, and a copy inhibition code 322. That is, the image 300 has assigned thereto two kinds of codes; a digital code and a copy inhibition code. Here, the digital code may be singular or plural. When there are plural digital codes, the arrangement relationship among the digital codes (such as a predetermined distance between the digital codes) is determined in advance. For example, as shown in FIG. 3, two digital codes may be disposed on top and bottom of the image 300. When two sheets of document media are overlapped with each other, the distance between the digital codes of the respective document media often becomes shorter than the predetermined distance. Therefore, it is desirable to dispose the digital codes so that the distance therebetween becomes the largest in its sheet size.

FIGS. 4A to 4D are explanatory diagrams showing the cases where two sheets of document media are read in an overlapping state. Two sheets of document media may be read in an overlapping state because of a user's carelessness or defect of an automatic document feeder.

The first sheet of a document medium 410 is of A3 size and a user of the first sheet has a copy authority. A digital code 411 and a digital code 412 represent that the user of the first sheet possesses the copy authority.

The second sheet of a document medium 420 is of A4 size and a user of the second sheet has no copy authority. A digital code 421 and a digital code 422 represent that the user of the second sheet does not possess the copy authority.

When the document medium 410 and the document medium 420 are to be copied, there may be a case where the document medium 410 is overlapped with the document medium 420 as shown in FIG. 4A.

That is, when the copying operation is to be performed in the state shown in FIG. 4A, an image 430 has a digital code 431, a digital code 432, a digital code 433, and a digital code 434 as shown in FIG. 4B. In this case, when the permission/inhibition of the copying operation is determined in accordance with the security policy of a digital cord that is found first, the determination is made based on the digital code 431 of the image 430, and the copying operation is permitted. As a result, contents of the document medium 420 are copied as well.

Also, there may be the case where the copying operation is performed in the state shown in FIG. 4C or 4D, that is, the case where a document medium 450 is read obliquely with respect to a document medium 440 in an overlapping state (FIG. 4C), or the case where document media 460 and 470 are read in a state where the document medium 470 is partially folded (FIG. 4D). In such cases, there is a security problem if a user having a copy authority over one document but having no copy authority over the other document can copy all of the two sheets.

Figure 5C:
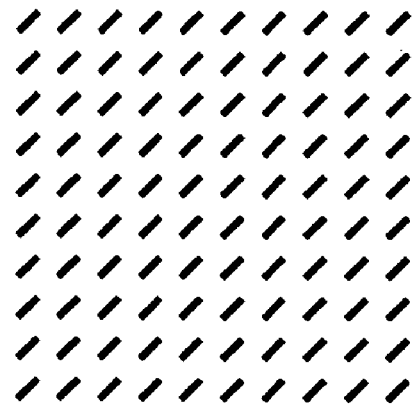
FIGS. 5A to 5C are explanatory diagrams showing examples of the codes.
Figure 5B:
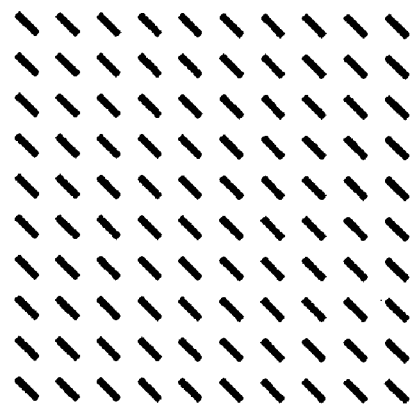
Figure 5A:
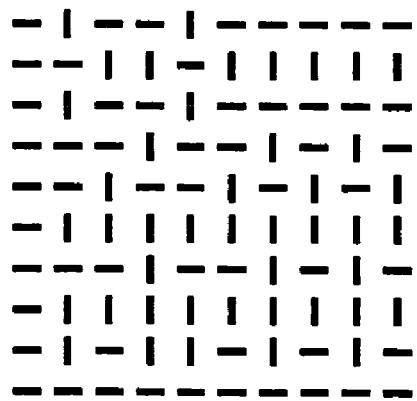

FIGS. 5A to 5C are explanatory diagrams showing examples of the codes. Specifically, FIG. 5A shows an example of the digital code, FIG. 5B shows an example of a first copy inhibition code, and FIG. 5C shows an example of a second copy inhibition code.

The digital code is constructed by arranging two kinds of patterns consisting of a vertical bar (bit value: 1) and a horizontal bar (bit value: 0). With this arrangement, the digital code represents attribute data (for example, a document ID and a user ID. Data being used for making inquiries concerning the copy authority to the security policy server 210) relating to the copy authority.

The copy inhibition code includes two kinds of codes: the first copy inhibition code consisting of a right oblique line (/) and the second copy inhibition code consisting of a left oblique line (\). In this exemplary embodiment, to inhibit copying, the two kinds of copy inhibition codes are added to an image. The copy inhibition code 321 of FIG. 3 is an example in which a plurality of the two kinds of copy inhibition codes shown in FIGS. 5B and 5C are arranged continuously.

In order to detect digital codes and copy inhibition code from an image while distinguishing the digital codes and the copy inhibition codes from each other, the code patterns (vertical bars and horizontal bars) constituting the digital code are different from the code patterns (right oblique lines and left oblique lines) of the copy inhibition code.

Figure 6:
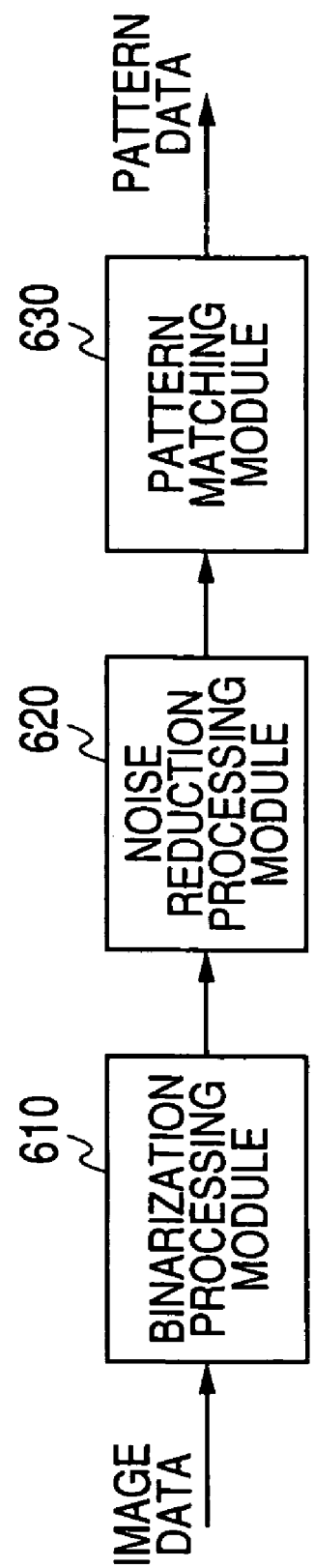
FIG. 6 is a conceptual diagram showing the exemplary internal configuration of a pattern detection module.

FIG. 6 is a conceptual diagram showing the exemplary internal configuration of the pattern detection module 115.

The pattern detection module 115 has a binarization processing module 610, a noise reduction processing module 620, and a pattern matching module 630. The pattern detection module 115 detects a fine code pattern constructing a code, from read image data (a scan image). Then, the detection results are output to and stored in the pattern data buffer 116.

The binarization processing module 610 is connected to the noise reduction processing module 620. The binarization processing module 610 binaries the image read by the image reading apparatus 150. The binarized image is passed to the noise reduction processing module 620.

The noise reduction processing module 620 is connected to the binarization processing module 610 and the pattern matching module 630. The noise reduction processing module 620 receives the binarized image from the binarization processing module 610 and performs noise reduction for the binarized image. Then, the noise reduction processing module 620 passes the noise-reduced image to the pattern matching module 630.

The pattern matching module 630 is connected to the noise reduction processing module 620. The pattern matching module 630 performs pattern matching by applying four kinds of pattern templates (pattern number 0: left oblique line, pattern number 1: right oblique line, pattern number 2: vertical bar, and pattern number 3: horizontal bar; see FIGS. 9A to 9D) to the respective pixels of the image, which has been subjected to the binarization process and the noise reduction process. The pattern number corresponding to the matched pattern template and the detected position coordinate are output as pattern data.

Figure 8:
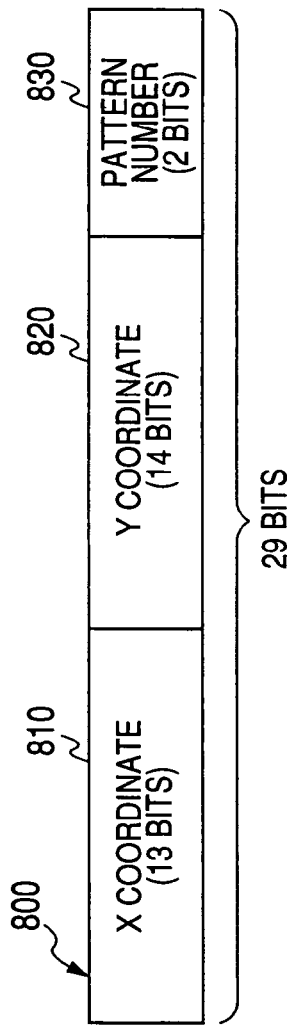
FIG. 8 is an explanatory diagram showing an example of pattern data that is output from the pattern detection module.
Figure 9D:
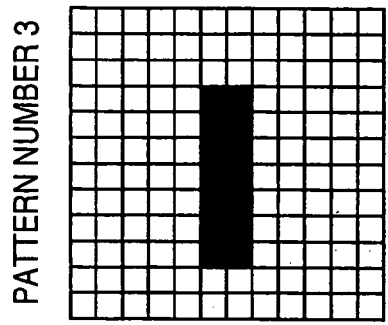
FIGS. 9A to 9D are explanatory diagrams showing examples of a pattern template.
Figure 9C:
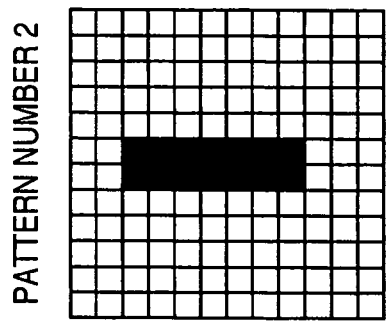
Figure 9B:
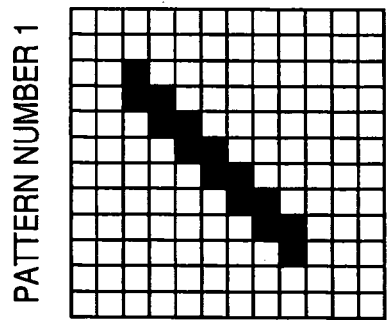
Figure 9A:
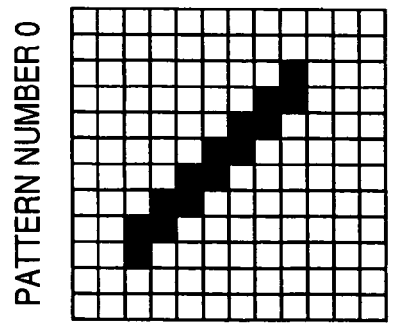

Next, the pattern data will be described with reference to FIG. 8. The pattern data 800 includes an X coordinate 810 having 13 bits, a Y coordinate 820 having 14 bits, and a pattern number 830 having 2 bits. In this exemplary embodiment, one pattern data 800 have 29 bits. Alternatively, for easy implementation, a dummy bit having 3 bits may be added thereto so as to correspond to a memory bit width of 32 bits and be stored in a memory.

Figure 7:
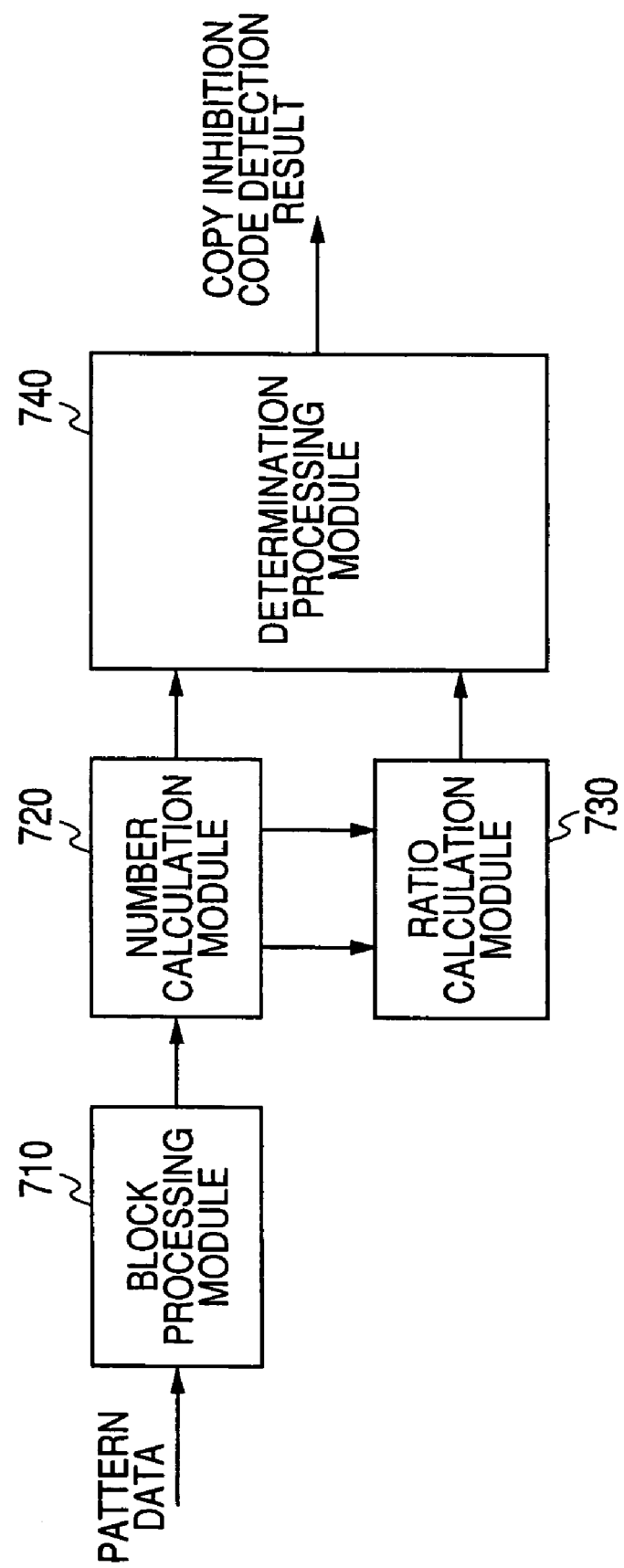
FIG. 7 is a conceptual diagram showing the exemplary internal configuration of a copy-inhibition-code detection module.

FIG. 7 is a conceptual diagram showing the exemplary internal configuration of a copy-inhibition-code detection module 114.

The copy-inhibition-code detection module 114 has a block processing module 710, a number calculation module 720, a ratio calculation module 730, and a determination processing module 740. The copy-inhibition-code detection module 114 receives the pattern data output from the pattern detection module 115 and outputs a detection result of copy inhibition information.

The block processing module 710 is connected to the number calculation module 720. The block processing module 710 divides the pattern data into blocks having a size smaller than the code shown in FIGS. 5A to 5C. The blocks of the pattern data are passed to the number calculation module 720.

The number calculation module 720 is connected to the block processing module 710, the ratio calculation module 730, and the determination processing module 740. The number calculation module 720 receives the blocks of the pattern data from the block processing module 710 and calculates the number N of patterns (the number of pattern data within a block) for each block. Then, the number calculation module 720 passes the number N of patterns to the ratio calculation module 730 and the determination processing module 740.

The ratio calculation module 730 is connected to the number calculation module 720 and the determination processing module 740. The ratio calculation module 730 calculates a pattern-bit-value ratio R. The bit value is calculated from the pattern number. It is assumed that the pattern numbers 0 and 2 have a bit value of 0, and that the pattern numbers 1 and 3 have a bit value of 1. The number of bit values 0 and the number of bit values 1 are counted, and the number of bit values 1 is divided by the number N of patterns. The result of the division process is defined as the pattern-bit-value ratio R. Then, the pattern-bit-value ratio R is passed to the determination processing module 740.

The determination processing module 740 is connected to the number calculation module 720 and the ratio calculation module 730. The determination processing module 740 receives the number N of patterns from the number calculation module 720 and the pattern-bit-value ratio R from the ratio calculation module 730, and detects the copy inhibition information. That is, the number of patterns and the pattern-bit-value ratio are compared with predetermined threshold values TH1 and TH2 (for example, 0.95), respectively, to thereby determine as to whether or not a block in question is a block included in the copy inhibition code.

More specifically, the determination is made as follows.
(1) If N>TH1 and R>TH2, the block in question is determined as the first copy inhibition block.
(2) If N>TH1 and R<1.0−TH2, the block in question is determined as the second copy inhibition block.

Thereafter, the number of blocks that are determined as the first copy inhibition block and the number of blocks that are determined as the second copy inhibition block are counted. When both of the counted numbers exceed a threshold value TH3, it is determined that the image includes the copy inhibition code, and the determination result is passed to the control module 111.

Figure 10:
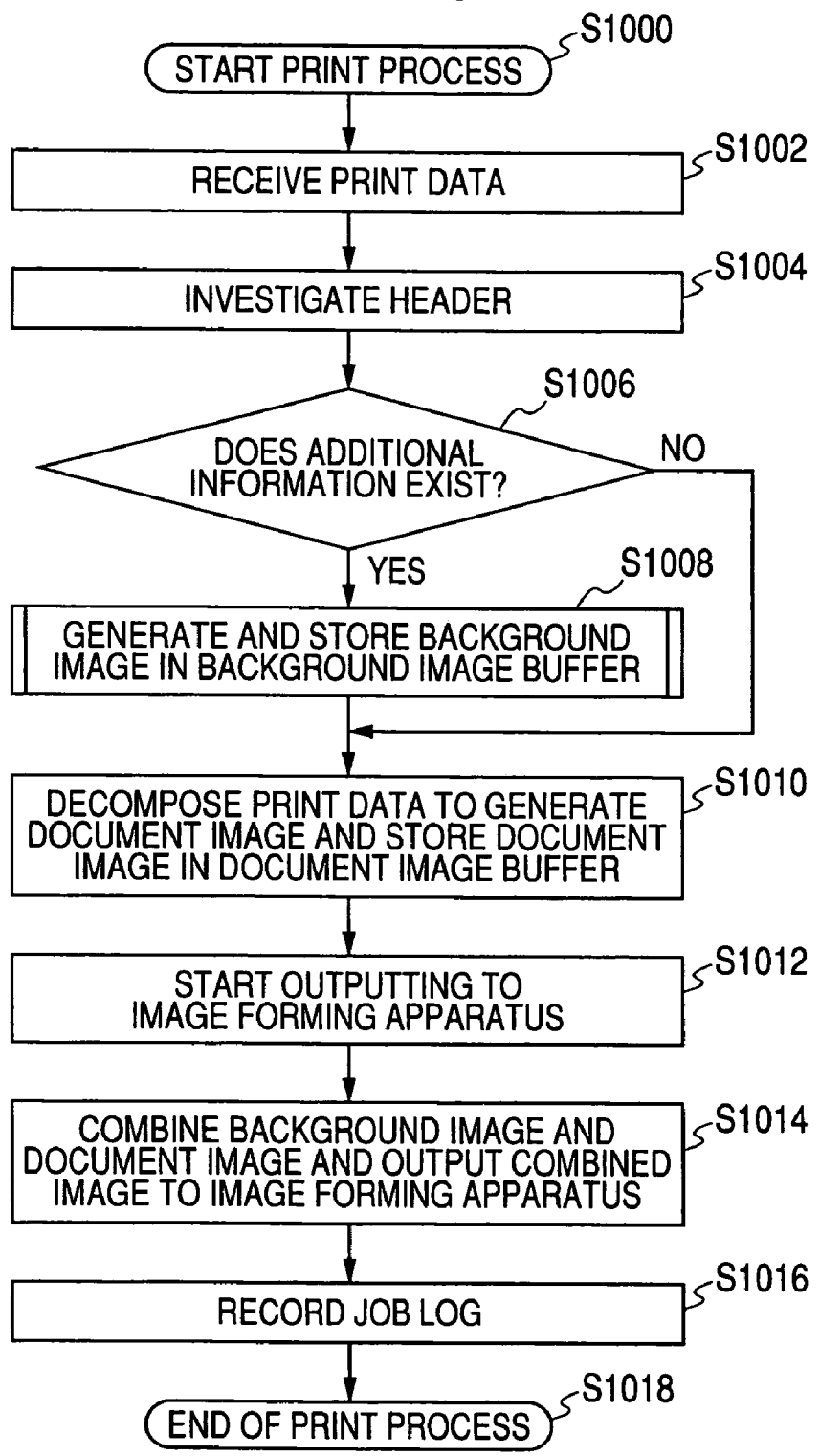
FIG. 10 is a flow chart showing an exemplary process of a print operation that is performed by an image processing apparatus.

FIG. 10 is a flow chart showing an exemplary process of a print operation that is performed by the image processing apparatus 110.

In step s1002, the control module 111 receives print data transmitted from the client PC 220 via the network 170 and the network I/F module 113.

In step S1004, the control module 111 investigates a header (control information) of the received print data.

In step S1006, it is determined as to whether or not additional information (including a code addition command containing a document ID) is present in the header. If the additional information is present, the flow proceeds to step S1008. Otherwise, the flow proceeds to step S1010.

In step S1008, the control module 111 generates a background image based on the additional information and stores the background image in the background image buffer 120. The process performed in the step S1008 will be described later in detail with reference to a flow chart shown in FIG. 11.

In step S1010, the control module 111 decomposes the print data received in step S1002 (converts the received print data into a bitmap image or the like that is printable by the image forming apparatus 160) to generate a document image and stores the document image in the document image buffer 119.

In step S1012, the control module 111 instructs the image forming apparatus 160 to output an image. Then, the image forming apparatus 160 performs output preparation and enters a standby state.

In step S1014, the image composition module 121 accesses the document image buffer 119 and the background image buffer 120, combines the both images and passes the combined image to the image forming apparatus 160. Then, the image forming apparatus 160 performs printing.

In step S1016, the control module 111 transmits the document ID of the printed document, a user ID representing a user who issued the print command, date and time, the security policy, and the like to the log management server 230 via the network I/F module 113 and the network 170. The document ID, the user ID, the date and time, and the security policy are stored as a log in the log management server 230.

Figure 11:
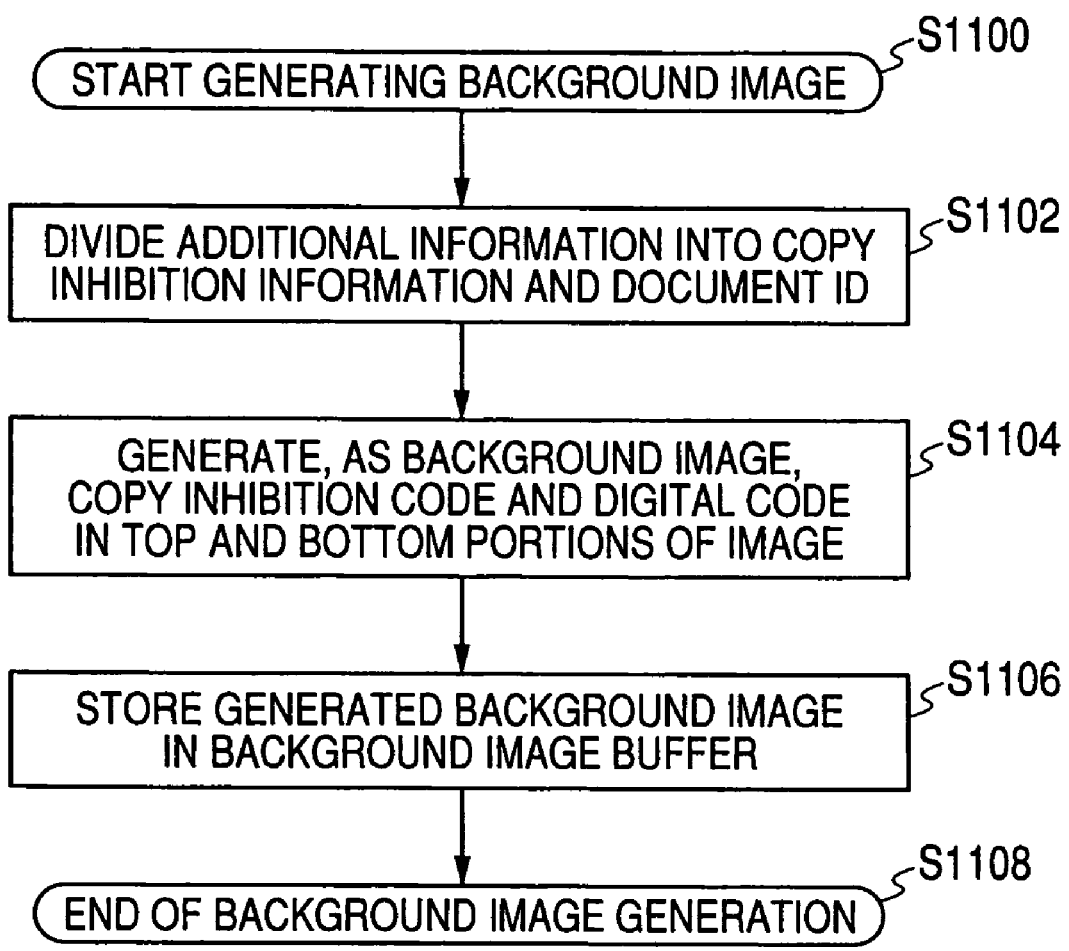
FIG. 11 is a flow chart showing an exemplary process of generating a background image by the image processing apparatus.

FIG. 11 is a flow chart showing an exemplary process of generating a background image by the image processing apparatus 110. This flow chart shows details of the exemplary process performed in the step S1008 of the flow chart shown in FIG. 10.

In step S1102, the control module 111 divides the additional information of the print data received in step S1002 into copy inhibition information and document ID information.

In step S1104, the control module 111 generates, as a background image, a copy inhibition code and a digital code in the top and bottom areas of an image as shown in FIG. 3.

In step S1106, the control module 111 stores the generated background image in the background image buffer 120.

Figure 12:
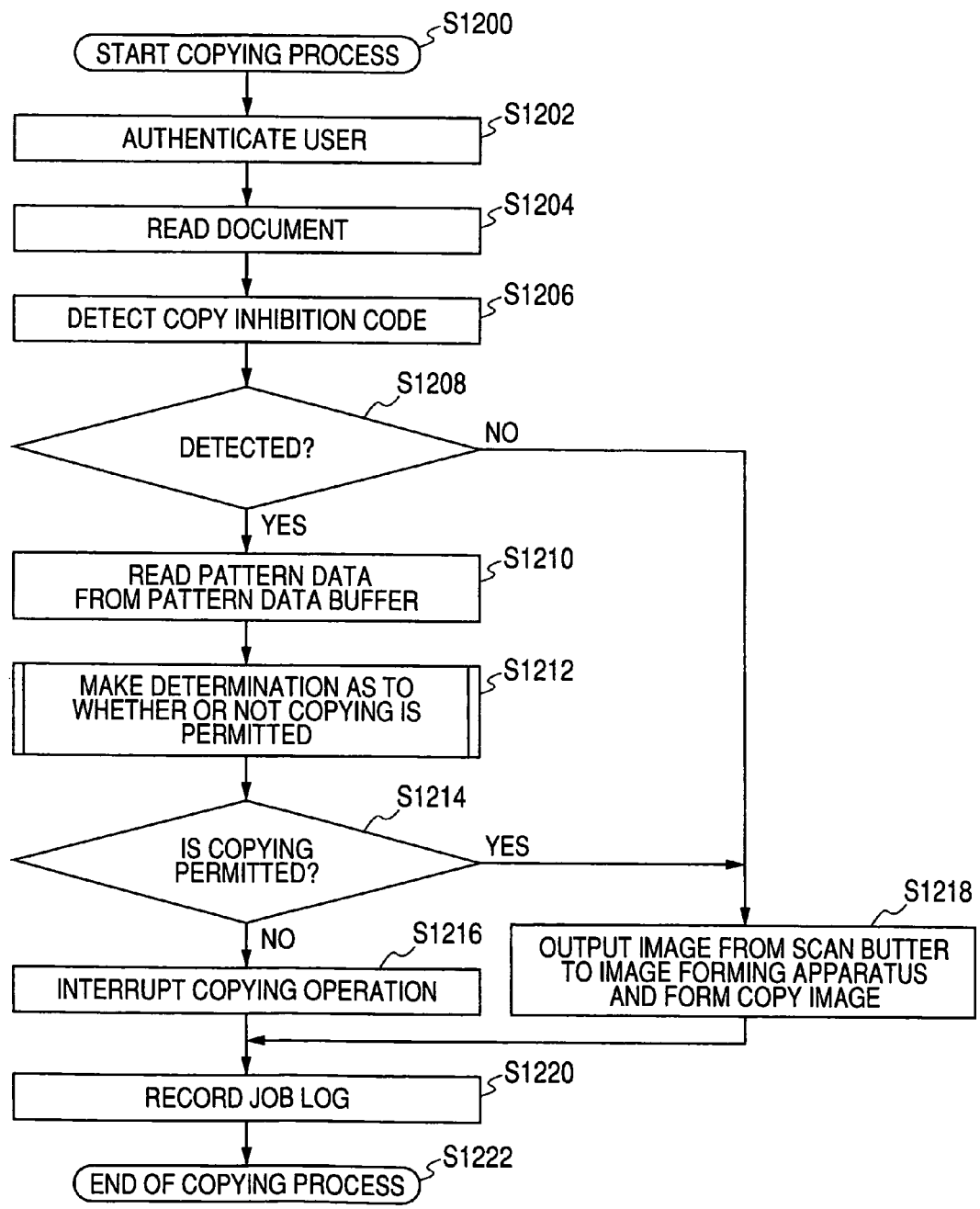
FIG. 12 is a flow chart showing an exemplary process of a copying operation that is performed by the image processing apparatus.

FIG. 12 is a flow chart showing an exemplary process of a copying operation that is performed by the image processing apparatus 110.

In step S1202, the control module 111 authenticates a user who is to use the image processing apparatus 110.

In step S1204, the image reading apparatus 150 reads a document medium in accordance with a user's copying operation.

In step S1206, the processes by the pattern detection module 115 and the copy-inhibition-code detection module 114 is performed for the image read in step S1204 to detect a copy inhibition code.

If the copy inhibition code is detected in step S1208, the flow proceeds to step S1210, and otherwise, the flow proceeds to step S1218.

In step S1210, the control module 111 accesses the pattern data buffer 116 and extracts the pattern data.

In step S1212, the control module 111 determines as to whether or not the copying operation for the document is permitted. This determination process will be described later in detail with reference to flow charts shown in FIGS. 13 to 17.

In step S1214, if the determination result in step S1212 indicates the copying operation is permitted, the flow proceeds to step S1218, and otherwise, the flow proceeds to step S1216.

In step S1216, since it is the case where the user is not permitted to perform the copying operation of the document, the control module 111 interrupts the copying process. Also, that effect may be displayed on a panel of the image processing apparatus 110 via the control panel module 112.

In step S1218, the control module 111 passes the scan image from the scan image buffer 118 to the image forming portion 160 via the image composition module 121 so that the copying operation is performed.

In step S1220, the control module 111 transmits the document ID of the copied document, the user ID representing the user who issued the copy command, the data and time, success or failure of the copying, and the like to the log management server 230 via the network I/F module 113 and the network 170. The document ID, the user ID, the data and time, and the success or failure of the copying are stored as a log in the log management server 230.

The flow charts of FIGS. 13 to 17 show exemplary processes performed in the step S1212 of the flow chart shown in FIG. 12. Any one or a combination of these processes is performed.

Figure 13:
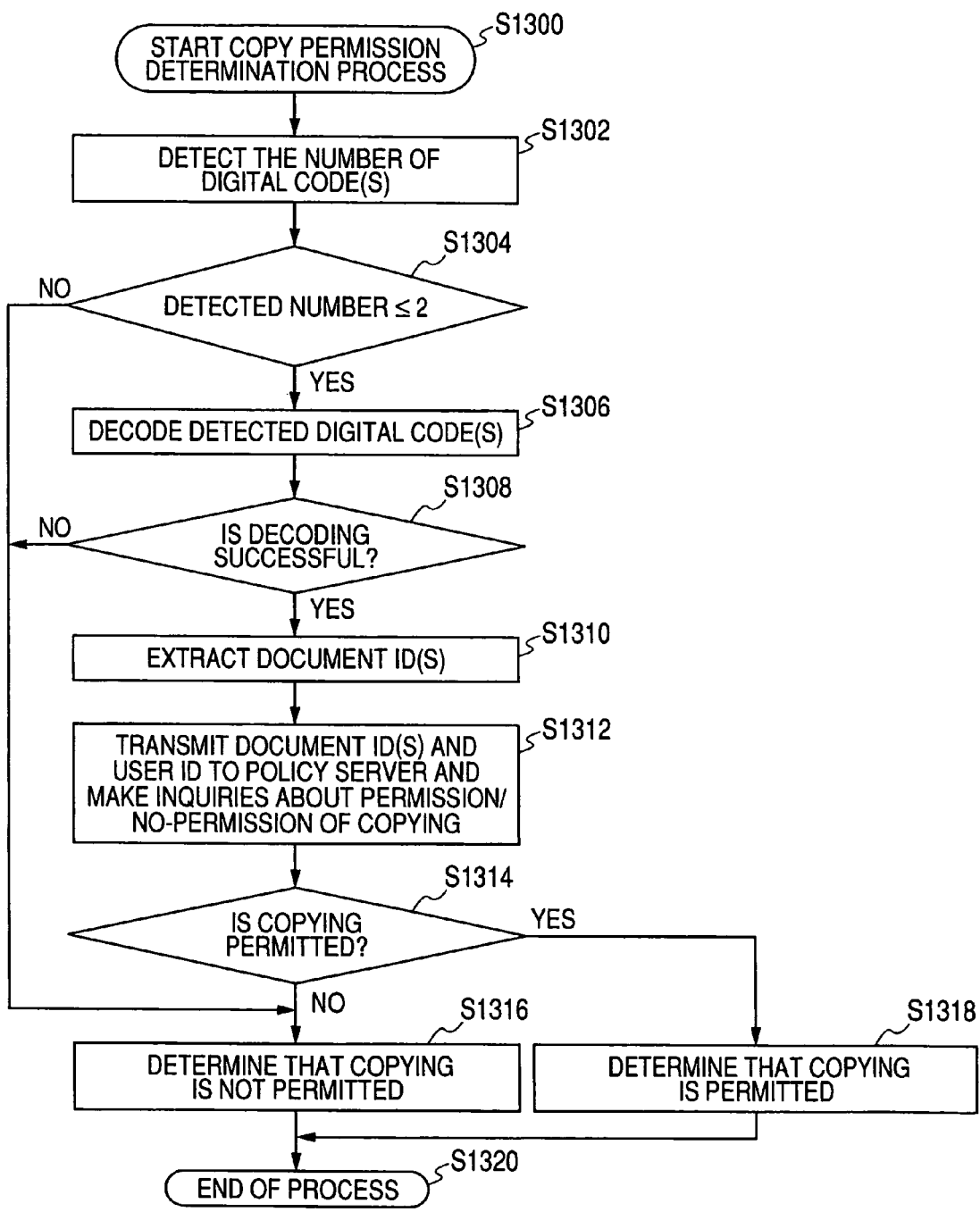
FIG. 13 is a flow chart showing a first example of a copy permission determination process that is performed by the image processing apparatus.

FIG. 13 is a flow chart showing a first example of the copy permission determination process that is performed by the control module 111 of the image processing apparatus 110. This process determines as to whether or not plural document media are overlapped, based on the number of digital codes included in the scan image.

In step S1302, the number of digital codes included in the scan image read by the image reading apparatus 150 is detected.

The procedure ((1) to (5)) of detecting the number of digital codes is as follows:

(1) One page of the scan image is divided into blocks.
(2) The number N2 of patterns corresponding to the pattern number 2 or 3 in each block and a ratio R2 of the number of patterns corresponding to the pattern number 2 or 3 to the number of the all patterns (corresponding to the pattern numbers 1 to 4) are calculated.
(3) If N2>TH4 and R2>TH5, it is determined that the block in question is a block included in the digital code. Here, TH4 and TH5 are predetermined threshold values.
(4) If the blocks included in the digital codes are adjacent to each other, it is determined that the blocks belong to the same digital code and the blocks are combined into a digital code block cluster.
(5) The number of digital code block clusters included in the one page of the scan image is calculated. This number corresponds to the number of digital codes included in the scan image.

In step S1304, it is determined as to whether or not the number detected in step S1302 is equal to or less than 2. If the number is equal to or less than 2, the flow proceeds to step S1306, and otherwise, the flow proceeds to step S1316. In this exemplary embodiment, two digital codes should be present on one document medium as shown in FIG. 3. Therefore if three or more digital codes are detected, it is determined that copying is not permitted.

In step S1306, the digital code detected in step S1302 is decoded.

In step S1308, it is determined as to whether or not the decoding in step S1306 is successful.

If the decoding is successful, the flow proceeds to step S1310, and otherwise, the flow proceeds to step S1316.

In step S1310, a document ID which is expressed in the decoded digital code is extracted.

In step S1312, the document ID extracted in step S1310 and the user ID authenticated in step S1202 are transmitted to the security policy server 210, and inquiries are made about permission/no-permission of copying. Then, the result is obtained.

In step S1314, it is determined as to whether or not the response from the security policy server 210 indicates permission of copying. If the response indicates that copying is permitted, the flow proceeds to step S1318, and otherwise, the flow proceeds to step S1316.

In step S1316, it is determined that copying is not permitted.

In step S1318, it is determined that copying is permitted.

Figure 14:
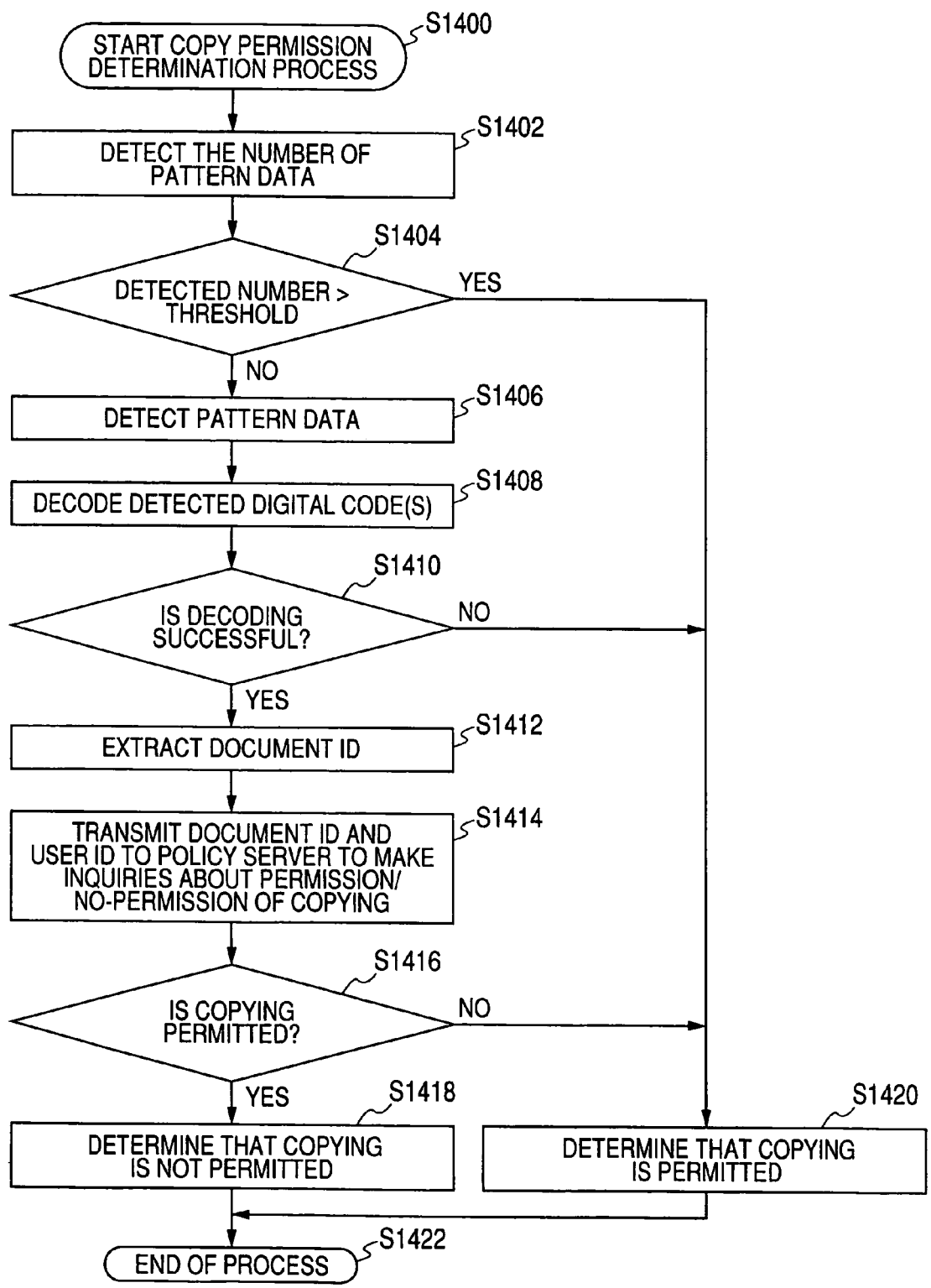
FIG. 14 is a flow chart showing a second example of the copy permission determination process, which is performed by the image processing apparatus.

FIG. 14 is a flow chart showing a second example of the copy permission determination process, which is performed by the control module 111 of the image processing apparatus 110. This process determines as to whether or not plural document media are overlapped, based on the number of pattern data which are detected by the pattern detection module 115. If plural document media are read in an overlapping state, the number of code patterns constructing the digital code and the copy inhibition code included in the scan image increases (i.e., the area of the codes increases). That is, it is determined as to whether or not plural document media are overlapped, based on the number of detected code patterns.

In step S1402, the control module 111 detects the number of the pattern data 800 stored in the patter data buffer 116.

In step S1404, the detected number is compared with a predetermined threshold value. If the detected number is larger than the threshold value, the flow proceeds to step S1420, and otherwise, the flow proceeds to step S1406. Here, the threshold value is the number of code patterns that should be included in one sheet of an image.

In step S1406, the patter data are detected.

In step S1408, the digital code(s) included in the pattern data detected in step S1406 is decoded.

In step S1410, it is determined as to whether or not the decoding in step S1410 is successful.

If the decoding is successful, the flow proceeds to step S1412, and otherwise, the flow proceeds to step S1420.

In step S1412, a document ID which is expressed in the decoded digital code is extracted.

In step S1414, the document ID extracted in step S1412 and the user ID authenticated in step S1202 are transmitted to the security policy server 210, and inquiries are made about permission/no-permission of copying. Then, the result are obtained.

In step S1416, it is determined as to whether or not the response from the security policy server 210 indicates permission of copying. If the response indicates permission of copying, the flow proceeds to step S1418, and otherwise, the flow proceeds to step S1420.

In step S1418, it is determined that copying is not permitted.

In step S1420, it is determined that copying is permitted.

Figure 15:
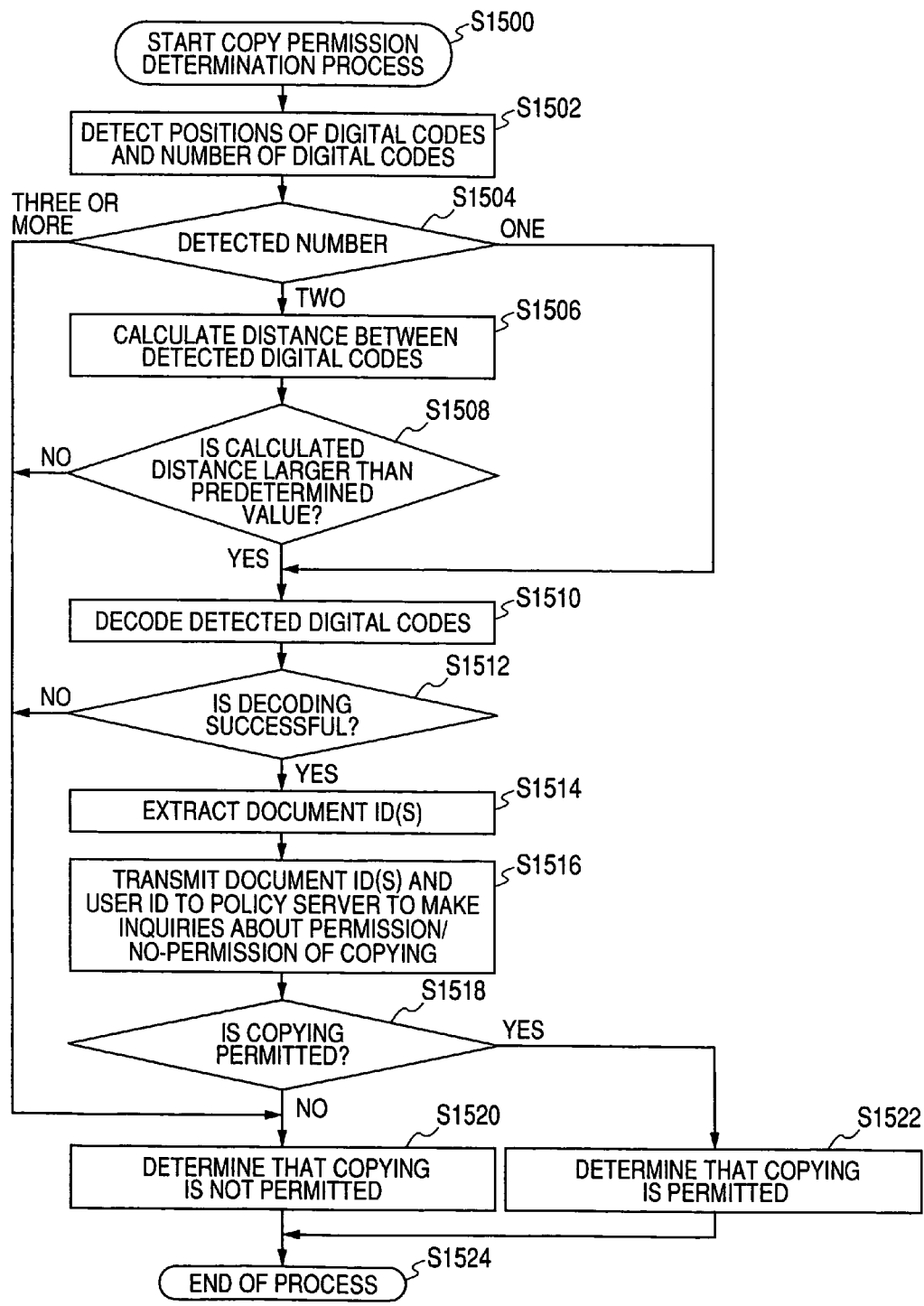
FIG. 15 is a flow chart showing a third example of the copy permission determination process, which is performed by the image processing apparatus.

FIG. 15 is a flow chart showing a third example of the copy permission determination process, which is performed by the control module 111 of the image processing apparatus 110. This process determines as to whether or not plural document media are overlapped, based on the number of digital codes included in the scan image and a positional relationship (distance) between the codes. In this exemplary embodiment, if a scan image is properly scanned, the number of digital codes included in the image is two and the digital codes are distant from each other by a predetermined distance. If three or more digital codes are detected from the scan image or if the distance between the codes is too small, it is determined that the image is not properly scanned and that plural document media are read in the overlapping state.

In step S1502, position(s) of digital code(s) included in a scan image and number of the digital codes are detected.

The procedure ((1) to (5)) of detecting the positions of the digital codes is as follows.

(1) One page of the scan image is divided into blocks.

(2) The number N2 of patterns of the pattern number 2 or 3 in each block and the ratio R2 of the number of patterns of the pattern number 2 or 3 to the number of the all patterns (the pattern numbers 1 to 4) are calculated.

(3) If N2>TH4 and R2>TH5, it is determined that a block in question is a block included in the digital code. Here, TH4 and TH5 are predetermined threshold values.

(4) If the blocks included in the digital codes are adjacent to each other, it is determined that the blocks belong to the same digital code and are combined into a digital code block cluster.

(5) The position coordinates of the digital code block clusters included in the one page of the scan image and the number of digital code block clusters are calculated. The position coordinates and the number are the position coordinates of the digital codes included in the scan image and the number of digital codes, respectively.

In step S1504, if the number of digital codes detected in step S1502 is one, the flow proceeds to step S1510; if the number is two, the flow proceeds to step S1506; and if the number is three or more, the flow proceeds to step S1520.

In step S1506, a distance between the detected two digital codes is calculated.

In step S1508, it is determined as to whether the digital codes are distant from each other by more than the predetermined value, based on the distance calculated in step S1506. If the digital codes are distant from each other by more than the predetermined value, the flow proceeds to step S1510, and otherwise, the flow proceeds to step S1520.

In step S1510, the digital codes) detected in step S1502 is decoded.

In step S1512, it is determined as to whether or not the decoding in step S1510 is successful.

If the decoding is successful, the flow proceeds to step S1514, and otherwise, the flow proceeds to step S1520.

In step S1514, a document ID which is expressed in the decoded digital code is extracted.

In step S1516, the document ID extracted in step S1514 and the user ID authenticated in step S1202 are transmitted to the security policy server 210, and inquiries are made about permission/no-permission of copying. Then, the result are obtained.

In step S1516, it is determined as to whether or not the response from the security policy server 210 indicates permission of copying.

If the response indicates permission of copying, the flow proceeds to step S1522, and otherwise, the flow proceeds to step S1520.

In step S1520, it is determined that copying is not permitted.

In step S1522, it is determined that copying is permitted.

Figure 16:
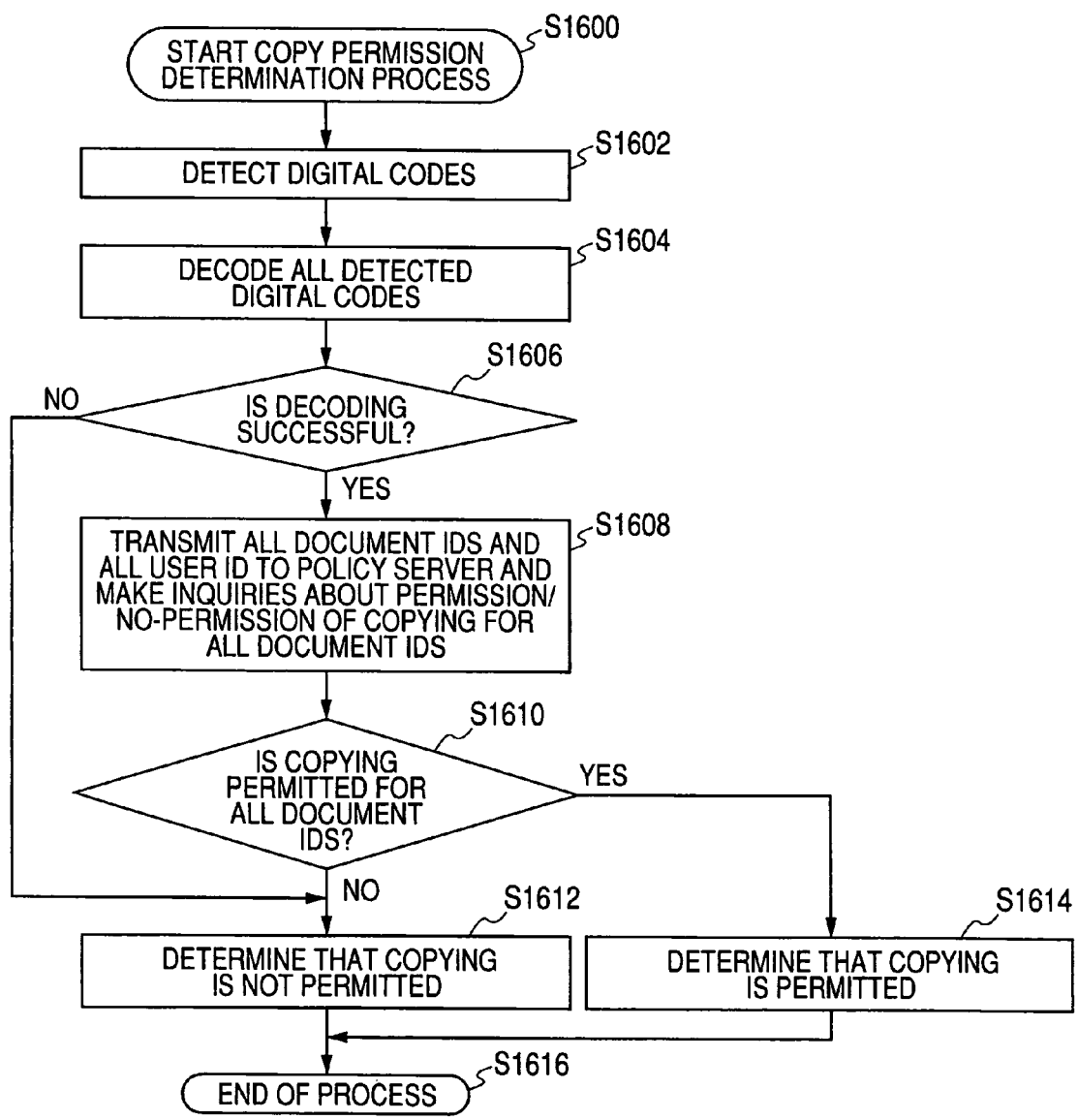
FIG. 16 is a flow chart showing a fourth example of the copy permission determination process, which is performed by the image processing apparatus.

FIG. 16 is a flow chart showing a fourth example of the copy permission determination process, which is performed by the control module 111 of the image processing apparatus 110. This process makes inquiries to the security policy server 210 by transmitting document IDs contained in all digital codes included in a scan image. Only when all the document IDs are permitted for copying, this process determines that the image is allowed for copying. If any one of the document IDs is not permitted for copying, this process determines that the image is not properly scanned and that plural document media are read in an overlapping state.

In step S1602, a digital code(s) in a scan image read by the image reading apparatus 150 is detected.

In step S1604, all the digital code(s) detected in step S1602 is decoded.

In step S1606, it is determined as to whether or not the decoding in step S1604 is successful. If the decoding is successful, the flow proceeds to step S1608, and otherwise, the flow proceeds to step S1612.

In step S1608, all document ID(s) that is included in the digital code(s) decoded in step S1604 and the user ID authenticated in step S1202 are transmitted to the security policy server 210, and inquiries are made about permission/no-permission of copying. Then, the result is obtained.

In step S1610, it is determined as to whether or not the response from the security policy server 210 indicates that all the document IDs are permitted for copying. If all the document IDs are permitted for copying, the flow proceeds to step S1614, and otherwise, the flow proceeds to step s1612.

In step S1612, it is determined that copying is not permitted.

In step S1614, it is determined that copying is permitted.

As another method, all the document IDs may be detected from all the detected digital codes, and the permission/no-permission of copying may be determined based on whether or not all the document IDs are identical with each other. That is, the copying is permitted when all the document IDs are identical, and the copying is not permitted (inhibition of copying) when the document IDs are different from each other.

This is because the case where the document IDs are different from each other occurs when a so-called overlapped scan (the case where plural document media are unexpectedly read by one scan operation) is performed.

Figure 17:
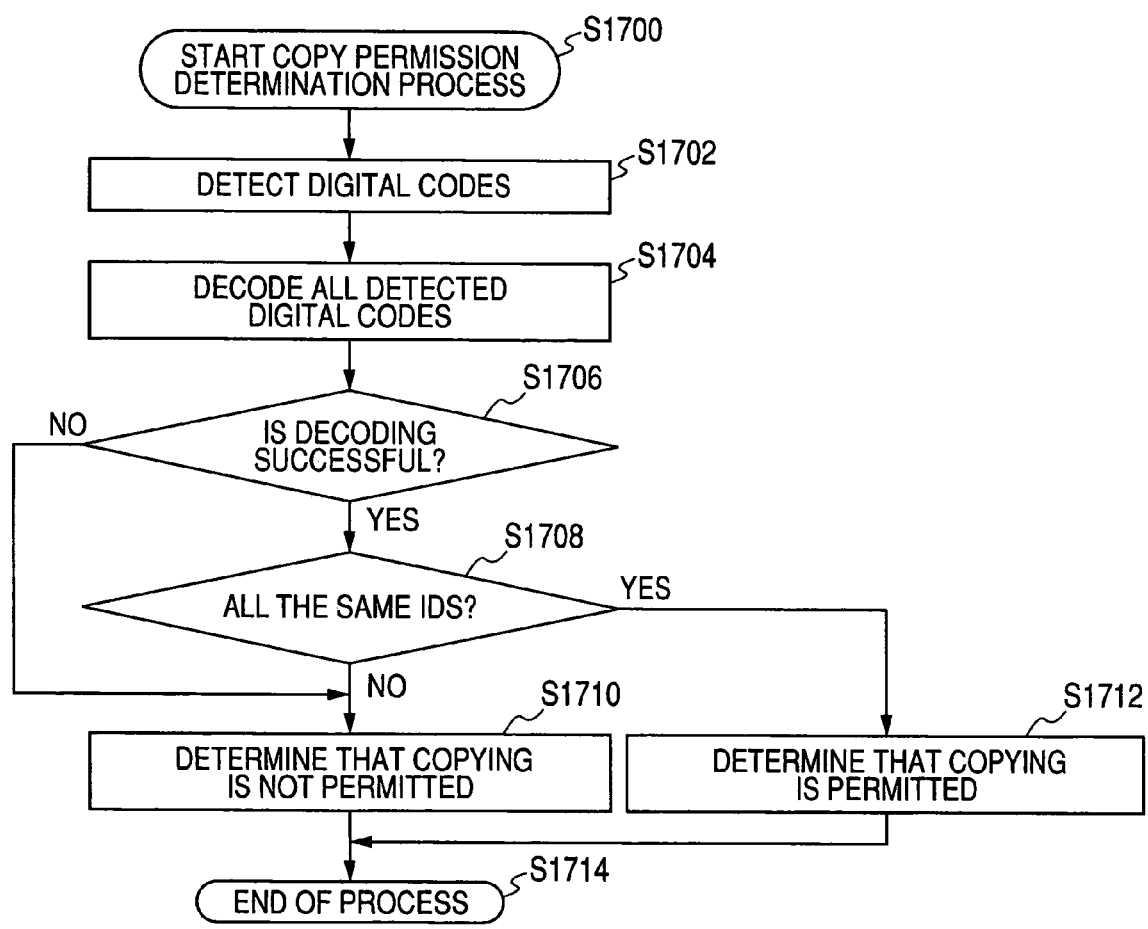
FIG. 17 is a flow chart showing a fifth example of the copy permission determination process, which is performed by the image processing apparatus.

FIG. 17 is a flow chart showing a fifth example of the Copy permission determination process, which is performed by the control module 111 of the image processing apparatus 110. Even if plural document media are overlapped, there may be a case where the number of digital codes included in a scan image is equal to the predetermined value. For example, such a case may occur when the upper half part of the second sheet is folded back and thus, the scan image is composed of the upper halt part of the first sheet and the lower half part of the second sheet. This process copes with the above case.

In step S1702, digital codes included in the scan image read by the image reading apparatus 150 is detected.

In step S1704, all the digital codes detected in step S1702 is decoded.

In step S1706, it is determined as to whether or not the decoding in step S1704 is successful. If the decoding is successful, the flow proceeds to step S1708, and otherwise, the flow proceeds to step S1710.

In step S1701, it is determined as to whether or not all the document IDs obtained by decoding the digital codes in step S1704 are the same document ID. If all the document IDs are identical, the flow proceeds to step S1712, and otherwise, the flow proceeds to step S1710.

In step S1710, it is determined that copying is not permitted.

In step S1712, it is determined that copying is permitted.

Next, an exemplary hardware configuration in accordance with the exemplary embodiment of the invention will be described with reference to FIG. 18. The hardware configuration shown in FIG. 18 is configured, for example, by a personal computer (PC) or the like and is provided with a data reading unit 1817 such as a scanner and a data output unit 1818 such as a printer.

A CPU (central processing unit) 1801 is a control unit that executes processes in accordance with a computer program having described therein execution sequences of various modules described in the exemplary embodiment, such as the copy-inhibition-code detection module 114, the pattern detection module 115, the scan image processing module 117, and the like.

A ROM (read only memory) 1802 stores programs, calculation parameters, or the like that the CPU 1801 uses. A RAM (random access memory) 1803 stores programs used in an execution performed by the CPU 1801 or parameters that appropriately change in the execution. The CPU 1801, the ROM 1802, and the RAM 1803 are connected to each other by a host bus 1804 that is configured as a CPU bus or the like.

The host bus 1804 is connected to an external bus 1806 such as a PCI (peripheral component interconnect/interface) bus through a bridge 1805.

A pointing device 1809 such as a keyboard 1808 or a mouse is an input device that is operated by a user. A display 1810 is formed of a liquid-crystal display apparatus, a CRT (cathode ray tube), or the like, and displays various pieces of information as text or images.

An HDD (hard disk drive) 1811 drives a hard disk installed therein to record or reproduce programs that are executed by the CPU 1801 and information into or from the hard disk. The hard disk stores a read image or data regarding security policy. In addition, various computer programs such as data processing programs are stored in the hard disk.

A drive 1812 reads data or a program recorded in a recoding medium 1813 loaded therein, such as a magnetic disc, an optical disc, a magneto-optical disc, or a semiconductor memory, and sends the data or program to the RAM 1803 connected thereto through an interface 1807, the external bus 1806, the bridge 1805, and the host bus 1804. The removable recording medium 1813 can be used as the same data recording area as the hard disk.

A connection port 1814 is a port for connection to an external connection device 1815 and has a connection portion such as USB or IEEE 1394. The connection port 1814 is connected to the CPU 1801 or the like via the interface 1807, the external bus 1806, the bridge 1805, and the host bus 1804. The communication portion 1816 executes a data communication process for communication with the external devices or apparatuses by being connected to a network. The data reading unit 1817 is a scanner, for example, and executes a document reading process. The data output unit 1818 is a printer, for example, and executes a document data output process.

The hardware configuration shown in FIG. 18 is only one example of possible configurations of the invention. The exemplary embodiment of the invention is not limited to that shown in FIG. 18. Any configuration can be employed as long as the configuration employed can execute the functions of the modules described in the exemplary embodiment. For example, some modules may be configured by a specific purpose hardware (for example, ASIC: application specific integrated circuit) and other modules are located in an external system so that the modules are connected to each other by a communication line. Alternatively, a plurality of the system shown in FIG. 18 may be connected to each other by a communication line so that the systems can operate in a cooperating manner. In addition, the modules of the exemplary embodiment of the invention may be installed in a copier, a fax machine, a scanner, a printer, or a multi-functional device.

In the exemplary embodiment described above, an exemplary configuration has been described and illustrated in which a document ID is embedded in a digital code and corresponding authority information (security policy) is managed by the security policy server 210; however, the authority information may be directly embedded in the digital code.

In addition, in the exemplary embodiment described above, the position of the code in the document medium is fixed; however, the code may be disposed at an arbitrary position on the entire surface of the document medium. Moreover, the code may be an invisible code or an equivalent thereof. The term "invisible code or equivalent thereof" refers to a code of which the presence is substantially impossible to determine when seen with unaided eyes or an equivalent code thereof. That is, the invisible code is a code which is not easily perceived by a human.

The program may be provided as a recording medium storing the program or may be provided by a communication means. In this case, the program may be embodied as the invention of "a computer-readable recording medium having a program recorded therein."

The term "a computer-readable recording medium having a program recorded therein" refers to a computer-readable recording medium having a program recorded therein, used for the purpose of install, execution or distribution of the program.

Examples of the recording medium include a DVD (digital versatile disc) of which the format includes "DVD-R, DVD-RW, and DVD-RAM", which are approved by the DVD Forum, and "DVD+R and DVD+RW", which are approved formats of DVD+RW: a CD (compact disc) such as CD-ROM (read only memory), CD-R (CD recordable), or CD-RW (CD rewritable); a magneto-optical disc (MO); a flexible disc (FD); a magnetic tape, a hard disk, a read only memory (ROM); an electrically erasable programmable read-only memory (EPROM), a flash memory, a random-access memory (RAM), and the like.

Part or the entire program may be recorded in the recording medium for the purpose of storage of distribution. Alternatively, the program may be transmitted via a transmission medium including, for example, a wired network that is used in a local area network (LAN), a metropolitan area network (MAN), a wide area network (WAN), an internet, an intranet, an extranet, or the like; a wireless communication network; or a combination of the wired network and the wireless communication network. Alternatively, the program may be embodied in a carrier wave.

The program may be a part of another program or may be recorded in a recording medium along with a separate program. Alternatively, the program may be partitioned into subprograms and the subprograms are recorded in a plurality of recording media. Moreover, the data recorded in the recording medium may be in any form including a compressed form and an encoded form as long as the data can be decompressed and decoded.

What is claimed is:

1. An image processing apparatus comprising:
a storage unit that stores a number of a plurality of information images included in a reference image, the information images representing data;
an image receiving unit that receives an image including one or more of the information images;
a detection unit that detects the one or more information images from the image received by the image receiving unit; and
a control unit that performs control relating to a copying operation of the image, based on a number of the one or more information images detected by the detection unit and the number of the information images stored in the storage unit,
wherein if the number of the one or more information images detected by the detection unit is larger than the number of the information images stored in the storage unit, the control unit performs the control so that the copying operation of the image is inhibited.

2. An image processing apparatus comprising:
a storage unit that stores a number of a plurality of information images included in a reference image, the information images representing data;
an image receiving unit that receives an image including one or more of the information images;
a detection unit that detects the one or more information images from the image received by the image receiving unit; and
a control unit that performs control relating to a copying operation of the image, based on a number of the one or more information images detected by the detection unit and the number of the information images stored in the storage unit, wherein
the storage unit further stores a distance between the plurality of information images included in the reference image, and
if the number of the one or more information images detected by the detection unit is equal to the number of the information images stored in the storage unit and if a distance between the detected information images is smaller than the distance stored in the storage unit, the control unit performs the control so that the copying operation of the image is inhibited.

3. An image processing apparatus comprising:
a storage unit that stores a number of a plurality of information images included in a reference image, the information images representing data;
an image receiving unit that receives an image including one or more of the information images;
a detection unit that detects the one or more information images from the image received by the image receiving unit;
a control unit that performs control relating to a copying operation of the image, based on a number of the one or more information images detected by the detection unit and the number of the information images stored in the storage; and
a decoding unit that decodes the one or more information images detected by the detection unit to obtain document identification information, wherein
the data represented by the information images includes document identification information,
the storage unit further stores a number of the document identification information, and
if the number of the document identification information obtained by the decoding unit is larger than the number of the document identification information stored in the storage unit, the control unit performs the control so that the copying operation of the image is inhibited.

4. An image processing apparatus comprising:
a storage unit that stores a number of a plurality of information images included in a reference image, the information images representing data;
an image receiving unit that receives an image including one or more of the information images;
a detection unit that detects the one or more information images from the image received by the image receiving unit;
a control unit that performs control relating to a copying operation of the image, based on a number of the one or more information images detected by the detection unit and the number of the information images stored in the storage; and a decoding unit that decodes the one or more information images detected by the detection unit to obtain document identification information, wherein the data represented by each information image includes document identification information, and if the document identification information obtained by the decoding unit are different from each other, the control unit performs the control so that the copying operation of the image is inhibited.

5. An image processing apparatus comprising:

a storage unit that stores a number of a plurality of information images included in a reference image, the information images representing data;

an image receiving unit that receives an image including one or more of the information images;

a detection unit that detects the one or more information images from the image received by the image receiving unit;

a control unit that performs control relating to a copying operation of the image, based on a number of the one or more information images detected by the detection unit and the number of the information images stored in the storage; and a decoding unit that decodes the one or more information images detected by the detection unit to obtain document identification information, wherein the data represented by each information image includes the document identification information, the control unit extracts information which relates to the copying operation and which corresponds to the document identification information obtained by the decoding unit, and if at least one of the extracted information indicates that copying is not permitted, the control unit performs the control so that the copying operation of the image is inhibited.

6. An image processing system comprising:

an image processing apparatus; and a copying-operation information processing apparatus connected to the image processing apparatus via a communication line, wherein the image processing apparatus includes an image receiving unit that receives an image including one or more information images representing data, a detection unit that detects the one or more information images from the image received by the image receiving unit, a decoding unit that decodes the one or more information images detected by the detection unit, to obtain document identification information, and a control unit that transmits the document identification information obtained by the decoding unit to the copying-operation information processing apparatus, and receives from the copying-operation information processing apparatus information which relates to a copying operation and which corresponds to the document identification information, if at least one of the received information indicates that copying is not permitted, the control unit performs control so that the copying operation of the image is inhibited, the copying-operation information processing apparatus includes a copying-operation-information storage unit that stores the document identification information and information relating to a copying operation of a document identified by the document identification information in association with each other, and a copying-operation-information transmission unit that transmits the information which relates to the corresponding copying operation and which is stored in the copying-operation-information storage unit, based on the document identification information received from the image processing apparatus, and if a number of the one or more information images detected by the detection unit is larger than a number included in the document identification information stored in the copying-operation-information storage unit, the control unit performs the control so that the copying operation of the image is inhibited.

7. A non-transitory computer-readable medium storing a program that causes a computer to execute image processing, the image processing comprising:

receiving an image including one or more information images that represent data;

detecting the one or more information images from the received image; and performing control relating to a copying operation of the image, based on a number of the one or more information images detected and a number of a plurality of information images that are included in a reference image and are stored in a storage unit, wherein if the number of the one or more information images is larger than the number of the information images, the copying operation of the image is inhibited.

8. An image processing method comprising:

receiving an image including one or more information images that represent data;

detecting the one or more information images from the received image; and performing control relating to a copying operation of the image, based on a number of the one or more information images detected and a number of a plurality of information images that are included in a reference image and are stored in a storage unit, wherein if the number of the one or more information images is larger than the number of the information images, the copying operation of the image is inhibited.

* * * * *